United States Patent
Kurras et al.

(10) Patent No.: US 11,784,730 B2
(45) Date of Patent: \*Oct. 10, 2023

(54) APPARATUS, SYSTEM AND METHOD FOR IMPROVING POSITION ESTIMATION AND/OR COMMUNICATION PERFORMANCE IN A WIRELESS COMMUNICATION NETWORK

(71) Applicant: Fraunhofer-Gesellschaft zur Foerderung der angewandten Forschung e.V., Munich (DE)

(72) Inventors: Martin Kurras, Berlin (DE); Lars Thiele, Berlin (DE); Thomas Wirth, Berlin (DE); Marcus Grossmann, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,191

(22) Filed: Jan. 7, 2022

(65) Prior Publication Data
US 2022/0239390 A1 Jul. 28, 2022

Related U.S. Application Data

(63) Continuation of application No. 16/712,670, filed on Dec. 12, 2019, now Pat. No. 11,223,430, which is a
(Continued)

(30) Foreign Application Priority Data

Jun. 14, 2017 (EP) .................................. 17176075

(51) Int. Cl.
*H04B 17/27* (2015.01)
*H04B 17/309* (2015.01)
(Continued)

(52) U.S. Cl.
CPC ............ *H04B 17/27* (2015.01); *G01S 5/0226* (2013.01); *G01S 5/08* (2013.01); *H04B 7/086* (2013.01);
(Continued)

(58) Field of Classification Search
CPC . G01S 5/0226; G01S 5/08; G01S 5/12; H04B 17/27; H04B 17/309; H04B 7/0413;
(Continued)

(56) References Cited

U.S. PATENT DOCUMENTS 5,945,948 A 8/1999 Buford et al.
7,046,987 B2 5/2006 Siegel et al.
(Continued)

FOREIGN PATENT DOCUMENTS

CN 1231730 A 10/1999
CN 1284830 A 2/2001
(Continued)

OTHER PUBLICATIONS

3GPP TSG-RAN R2-161377 Huawei et al., Discussion on Positioning, dated Feb. 15-19, 2016
(Continued)

*Primary Examiner* — Liton Miah
(74) *Attorney, Agent, or Firm* — Perkins Coie LLP; Michael A. Glenn

(57) ABSTRACT

An apparatus includes an antenna and a transceiver. The transceiver transmits a first signal via the antenna, the first signal including a unique identification of the apparatus and a request for receive information about the first signal at a receiver. The transceiver receives from the receiver a second signal via the antenna, the second signal including first information about a direction of arrival (DoA) of the first signal at the receiver and second information indicative of a location of the receiver.

16 Claims, 6 Drawing Sheets

Related U.S. Application Data continuation of application No. PCT/EP2018/064770, filed on Jun. 5, 2018.

(51) Int. Cl.

| | | |
|---|---|---|
| *G01S 5/02* | (2010.01) | |
| *G01S 5/08* | (2006.01) | |
| *H04B 7/08* | (2006.01) | |
| *H04B 7/0413* | (2017.01) | |
| *H04W 88/02* | (2009.01) | |

(52) U.S. Cl.
CPC ......... *H04B 17/309* (2015.01); *H04B 7/0413* (2013.01); *H04W 88/02* (2013.01)

(58) Field of Classification Search
CPC ...... H04B 7/0617; H04B 7/063; H04B 7/086; H04W 16/28; H04W 88/02
See application file for complete search history.

(56) References Cited

U.S. PATENT DOCUMENTS

| | | | |
|---|---|---|---|
| 10,028,089 B2 | 7/2018 | Na et al. | |
| 10,362,447 B2 | 7/2019 | Amizur et al. | |
| 10,705,175 B2 * | 7/2020 | Erad | G01S 3/043 |
| 2002/0196188 A1 | 12/2002 | Holt | |
| 2003/0114195 A1 | 6/2003 | Chitrapu et al. | |
| 2004/0072579 A1 | 4/2004 | Hottinen | |
| 2011/0199263 A1 | 8/2011 | Kang | |
| 2012/0015669 A1 | 1/2012 | Qin et al. | |
| 2012/0094687 A1 | 4/2012 | Choi et al. | |
| 2012/0119953 A1 | 5/2012 | Hosoya et al. | |
| 2012/0220313 A1 | 8/2012 | Li et al. | |
| 2013/0028246 A1 | 1/2013 | Gonikberg | |
| 2014/0162704 A1 | 6/2014 | Choi et al. | |
| 2015/0133157 A1 | 5/2015 | Xiao et al. | |
| 2015/0133173 A1 | 5/2015 | Edge | |
| 2015/0173038 A1 | 6/2015 | Quan et al. | |
| 2015/0331084 A1 | 11/2015 | Kim | |
| 2016/0135007 A1 | 5/2016 | Persson | |
| 2016/0295366 A1 | 10/2016 | Priyanto et al. | |
| 2017/0082729 A1 * | 3/2017 | Bar-Shalom | G01S 5/12 |
| 2017/0212204 A1 | 7/2017 | Amizur | |
| 2019/0104384 A1 | 4/2019 | Abou-Rizk | |
| 2019/0320403 A1 | 10/2019 | Zhang | |
| 2021/0058745 A1 | 2/2021 | Markhovsky | |

FOREIGN PATENT DOCUMENTS

| | | |
|---|---|---|
| CN | 102143576 A | 8/2011 |
| CN | 103476112 A | 12/2013 |
| CN | 103546963 A | 1/2014 |
| CN | 103582115 A | 2/2014 |
| CN | 104039009 A | 9/2014 |
| CN | 104244404 A | 12/2014 |
| CN | 104619018 A | 5/2015 |
| WO | 2016070931 A1 | 5/2016 |

OTHER PUBLICATIONS

3GPP, TR 36.897, V13.0.0 (Jun. 2015), "Study on Elevation Beamforming/Full-Dimension (FD) MIMO for LTE", 3rd Generation Partnership Project, vol. V13.0.0, Jul. 2015, Jul. 2015.

3GPP, TS 36.355, V13.1.0 (Mar. 2016), "LTE Positioning Protocol (LPP) (Release 13)", 3rd Generation Partnership Project, Mar. 2016, Mar. 2016.

3GPP, TS 36.455, V13.1.0 (Mar. 2016), "LTE Positioning Protocol A (LPPa) (Release 13)", 3rd Generation Partnership Project, Mar. 2016, Mar. 2016.

Fischer, S., "Observed Time Difference Of Arrival (OTDOA) positioning in 3GPP LTE", Qualcomm White Pap, vol. 1, pp. 1-62, Jun. 2014, Jun. 2014.

Kim, Y., et al., "Full dimension mimo (FD-MIMO): the next evolution of MIMO in LTE systems", Wireless Communications, IEEE, vol. 21, pp. 26-33, Apr. 2014, Apr. 2014.

Nam, Y. H., et al., "Full dimension MIMO for LTE-Advanced and 5G", Information Theory and Applications Workshop (ITA), 2015, pp. 143-148, Feb. 2015, XP032799805, Feb. 2015.

Kegang, Hu, et al., "Techniques of Wireless Positioning in Mobile Communication Systems", Journal of Jilin University, Jul. 2005.

* cited by examiner

APPARATUS, SYSTEM AND METHOD FOR IMPROVING POSITION ESTIMATION AND/OR COMMUNICATION PERFORMANCE IN A WIRELESS COMMUNICATION NETWORK

CROSS-REFERENCES TO RELATED APPLICATIONS

This application is a continuation of U.S. patent application Ser. No. 16/712,670, filed Dec. 12, 2019, which is a continuation of copending International Application No. PCT/EP2018/064770, filed Jun. 5, 2018, which is incorporated herein by reference in its entirety, and additionally claims priority from European Application No. EP 17 176 075.4, filed Jun. 14, 2017, which is incorporated herein by reference in its entirety.

BACKGROUND OF THE INVENTION

The present invention concerns the field of wireless communication networks or systems, and embodiments relate to apparatus, systems and methods for providing information allowing for an improved position estimation, and/or for providing an improved communication performance of the entities within the communication network, and/or for improving performance of MIMO (Multiple Input Multiple Output) systems.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. In the wireless communication system a transmission time interval (TTI) may be defined, e.g., 1 ms or less. The TTI is the granularity at which the data may be mapped from higher layers to the physical layer (PHY) to perform the transmission.

In a wireless communication network, like the one depicted in FIG. 1, it may be desired to locate a UE, like a drone, with a certain accuracy in a cell. When considering the example of a drone, the wireless communication network may cover a specific area, like one or more streets along which the drone is to travel, e.g., autonomously. The respective cells of the wireless communication network may cover parts of the respective streets, and the base stations serving the respective cells may be provided along the streets, e.g., the base stations may be mounted to lamp posts located along the street. For example, for autonomous traveling or for providing position information to an operator, the drone needs to determine its position within a cell. One approach to locate a UE, like a drone, within a cell or a certain area is based on an observed time difference of arrival (OTDOA) estimation that may be used in cellular communication networks, such as LTE, and which is a downlink positioning method that relies on the calculation of time of arrival (TOA) estimates using position reference signals (PRS) receives at the user equipment UE from one or more surrounding base stations (eNB), as is described, for example, in references [1] and [2]. PRS sequences are downlink signals that are designed for positioning purposes and that are broadcast to all radio terminals within a cell. The PRS sequences are radiated with the same transmit power from the antenna of the base station or the remote radio head (RRH) in all directions to cover all users at any location of the cell, i.e., to provide a cell-wide coverage. To distinguish the PRS sequences from different cells, each PRS sequence has associated therewith a cell-specific identifier also referred to as a physical cell identifier (PCI). The PCI is unique in a specific area and is used to identify the cell and thus the PRS sequence. At least three timing measurements from geometrically dispersed base stations are needed, relative to the UE's internal time base, in order to obtain a unique position in a plane. Four base stations are needed to obtain a unique position in a three-dimensional space as is described in reference [3].

In addition to the above mentioned approaches for a position estimation of mobile devices, another process is based on GNSS (Global Navigation Satellite System) and is described in reference [4]. Yet another process for a position estimation of mobile devices may be based on measurements of the SNR/RSSI (Signal-to-Strength Ratio/Receive Signal Strength Indicator) in WiFi or Bluetooth networks.

As described above, position estimation within a specific area may be desired for mobile devices. Among such mobile devices there may be mobile devices having a low or reduced processing capacity or power and a limited energy source, like a battery. An example of such mobile devices with low processing and energy are drones which may travel at a high speed. For such fast moving mobile devices the position may be estimated for security and privacy reasons, and a continuous update of the position update with a high periodicity/frequency may be desired.

While the above described approaches for estimating a position may provide satisfactory results, they come with several drawbacks. For example, all of the approaches described in references [1] to [4] need the mobile device to perform measurements and calculations for estimating the position, which may not be feasible for devices having limited processing and battery capacity. Also, the calculation may be time consuming so that once the position has been estimated, the actual position already changed. This may be true especially for fast moving mobile devices. For example, the GNSS approach described in reference goes together with a huge power consumption of the GNSS receivers, and it may take several seconds to obtain a first position using such GNSS receivers. Further, signal from the GNSS may not be available indoors, such as construction halls. Also, the GNSS may not be precise enough in environments in which the signals from the respective satellites are not directly received, as it may be the case in urban environments, such as in street canyons. Making use of SNR/RSSI measurements from a WiFi or a Bluetooth network needs an additional WiFi or Bluetooth receiver at the mobile device. In addition, such time of flight (ToF) based approaches need a tight synchronization between the transmitter and the receiver which may be hard to achieve.

Another issue regarding the wireless communication network described in reference to FIG. 1, is that the base stations used for serving the respective mobile devices UEs may provide for 3D beamforming or for a full dimension MIMO approach. This may be implemented in systems operating in accordance with the current LTE-Advanced pro standard or the 5G or NR (New Radio) standard. To implement 3D beamforming, a base station may include two-dimensional active antennas, as is described in detail in references [5] and [6]. To reduce the dimension of a channel, so-called grid-of-beam (GOB) concepts may be used to form effective antennas, as is outlined in reference [7]. Such beams are supposed to be stable over at least some time, like several tens of seconds. Dependent on the number of antennas and the array geometry such beams may have small half-power-beam widths (HPBWs). In such scenarios, in case a mobile device is communicating with the base station, either for an uplink (UL) or for a downlink (DL) communication, the mobile device is not necessarily exactly located in the direction of the main lobe of the beams provided by the base station, and this may be due to the small half-power-beam widths of the beams provided by the antenna array. Therefore, the performance of a communication between the mobile device and the base station may be deteriorated, for example, there may be a loss in the signal-to-noise ratio, either at the base station or at the mobile device, dependent on whether a UL- or DL-communication is performed.

Other approaches for estimating a position of a mobile device are described in references [8] to [11].

SUMMARY

According to an embodiment, an apparatus may have an antenna; and a transceiver, wherein the transceiver is configured to transmit a first signal via the antenna, the first signal including a unique identification of the apparatus and a request for receive information about the first signal at a receiver, and receive from the receiver a second signal via the antenna, the second signal including first information about a direction of arrival (DoA) of the first signal at the receiver and second information indicative of a location of the receiver.

According to another embodiment, an apparatus may have an antenna; and a transceiver, wherein the transceiver is configured to receive from a transmitter a signal via the antenna, the signal including information about a direction of a main lobe of the signal transmitted by the transmitter, and a signal processing unit configured to estimate a direction of a main lobe of the signal received from the transmitter, and to indicate, using a position of the apparatus and the estimated direction of the main lobe of the signal, a direction in which the apparatus should move to improve a communication with the transmitter.

According to another embodiment, an apparatus may have a plurality of antennas; and a transceiver, wherein the transceiver is configured to receive a first signal via the plurality of antennas, the first signal including a unique identification of a transmitter of the first signal and a request for receive information about the first signal at the apparatus, estimate a direction of arrival (DoA) of the first signal, and transmit to the transmitter a second signal via the plurality of antennas, the second signal including first information about the estimated direction of arrival (DoA) of the first signal at the apparatus and second information indicative of a location of the apparatus.

According to another embodiment, a wireless communication network may have: an entity including an apparatus, including an antenna; and a transceiver, wherein the transceiver is configured to transmit a first signal via the antenna, the first signal including a unique identification of the apparatus and a request for receive information about the first signal at a receiver, and receive from the receiver a second signal via the antenna, the second signal including first information about a direction of arrival (DoA) of the first signal at the receiver and second information indicative of a location of the receiver; and a base station including an apparatus of claim 15.

According to another embodiment, a method may have the steps of: transmitting a first signal via an antenna of a transmitter, the first signal including a unique identification of the transmitter and a request for receive information about the first signal at a receiver, and receiving, from the receiver, a second signal via the antenna of the transmitter, the second signal including first information about a direction of arrival (DoA) of the first signal at the receiver and second information indicative of a location of the receiver.

According to another embodiment, a method may have the steps of: receiving a first signal via the plurality of antennas of a receiver, the first signal including a unique identification of a transmitter and a request for receive information about the first signal at the receiver, estimating a direction of arrival (DoA) of the first signal at the receiver, and transmitting to the transmitter a second signal via the plurality of antennas, the second signal including first information about the estimated direction of arrival (DoA) of the first signal at the receiver and second information indicative of a location of the receiver.

Another embodiment may have a non-transitory digital storage medium having a computer program stored thereon to perform the method having the steps of: transmitting a first signal via an antenna of a transmitter, the first signal including a unique identification of the transmitter and a request for receive information about the first signal at a receiver, and receiving, from the receiver, a second signal via the antenna of the transmitter, the second signal including first information about a direction of arrival (DoA) of the first signal at the receiver and second information indicative of a location of the receiver, when said computer program is run by a computer.

Another embodiment may have a non-transitory digital storage medium having a computer program stored thereon to perform the method having the steps of: receiving a first signal via the plurality of antennas of a receiver, the first signal including a unique identification of a transmitter and a request for receive information about the first signal at the receiver, estimating a direction of arrival (DoA) of the first signal at the receiver, and transmitting to the transmitter a second signal via the plurality of antennas, the second signal including first information about the estimated direction of arrival (DoA) of the first signal at the receiver and second information indicative of a location of the receiver, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
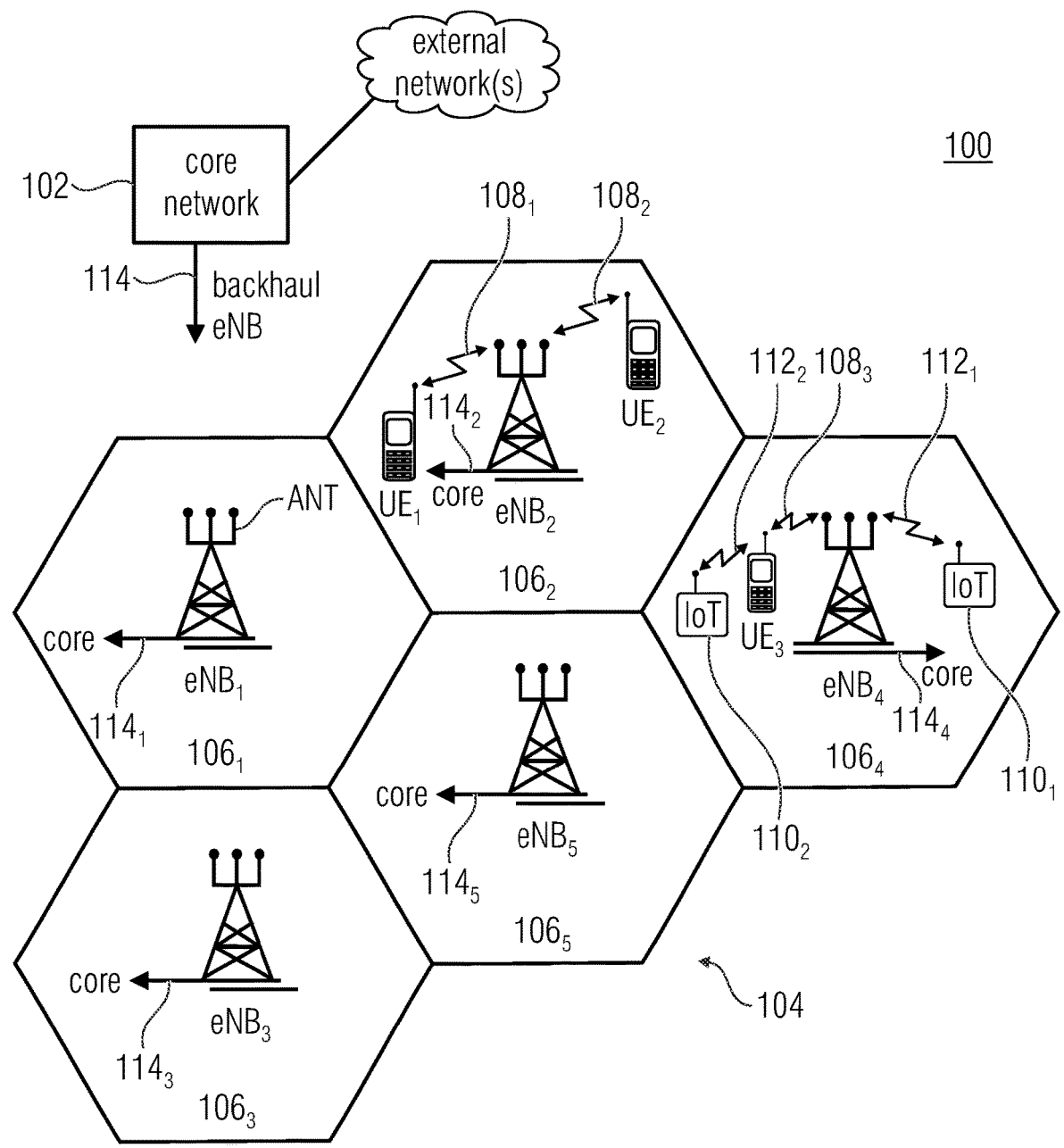
FIG. 1 shows a schematic representation of an example of a wireless communication system.

In the following, preferred embodiments of the present invention are described in further detail with reference to the enclosed drawings in which elements having the same or similar function are referenced by the same reference signs.

In accordance with a first aspect of the present invention, an apparatus, like a mobile device, sends out a first signal, like a beacon signal, that is received at a receiver, like a base station. The first signal is uniquely associated with the apparatus and includes a request for first signal receive information, i.e. information about the specifics of how the first signal is received by the receiver. The receiver, responsive to the first signal, generate a second signal or response signal that is unique for the apparatus, which had send the first signal, and that includes the requested first signal receive information and information allowing the apparatus to determine a location or position of the receiver, which sends out the second signal. In accordance with embodiments of the first aspect of the present invention, based on the response signal or the information conveyed by the response signal, the apparatus, like the mobile device, may estimate its position and/or may improve the performance of a communication with the receiver, like the base station. of the entities within the communication network, and/or for improving performance of MIMO (Multiple Input Multiple Output) systems.

In accordance with the first aspect the present invention provides an apparatus, like a mobile device, which includes an antenna and a transceiver, wherein the transceiver transmits a first signal via its antenna which includes a unique identification of the apparatus, and a request for receiving information about the first signal at a receiver, like a base station. The transceiver receives from the receiver a second signal via the antenna, which includes first information about a direction of arrival of the first signal at the base station and second information indicative of a location of the base station.

In accordance with the first aspect the present invention provides an apparatus, like a base station, which includes a plurality of antennas, and a transceiver, wherein the transceiver receives a first signal via the plurality of antennas which includes a unique identification of a transmitter, like a mobile device, of the first signal and a request for receive information about the first signal at the apparatus. The transceiver estimates a direction of arrival of the first signal, and transmits to the transmitter a second signal via the plurality of antennas, which includes first information about the estimated direction of arrival of the first signal at the apparatus and second information indicative of a location of the apparatus.

In accordance with embodiments of the second aspect, a mobile device may send out a beacon signal which is unique for the mobile device, for example by providing a unique identification. The beacon signal may include a request telling the base station, at which the beacon may be received, that an estimation of the direction of arrival (DoA) of the signal at the base station is to be performed. The DoA information is returned to the mobile device together with positional information about the base station.

In accordance with embodiments, the mobile device may estimate its position using the information included in the second signal. The mobile device may further determine a distance to the base station so that the position may be estimated using the position of the base station, the direction at which the beacon signal was received at the base station and the distance to the base station. The distance may be determined by a measurement of the receive power of the second signal from the base station and/or by a measurement of the time of arrival of the second signal. In accordance with embodiments, other known approaches for determining a distance to the base station may be employed by the mobile device. In accordance with yet other embodiments, the base station may estimate its position responsive to information included in the signal from a plurality of base stations. In addition to receiving the information in the second signal from a first base station, the information may be received from a second and even more base stations, a position of the mobile device may be estimated using of the information in the plurality of second signals received at the mobile device. In accordance with yet further embodiments, when receiving a second signal from a plurality of base stations, the distances to the bases stations may be determined, as described above, and used in addition to the information in the second signals.

The position of the base station may be indicated in the response signal using a unique identification or the actual position may be signaled. In case the unique identification is provided to the mobile device, the mobile station is allowed to access a table or a database including the actual position or location of a base station and the associated identification. This allows the mobile device, when accessing the data base using the received identification, to determine the actual position or location of the base station which may then be used for estimating the position. The DoA information may be provided as a unique direction vector or as values representing respective angles, such as horizontal and vertical angles, under which the first signal was received. In accordance with embodiments, the DoA information may be provided with respect to a coordinate system in which the base station and the mobile device are located so as to take into account a relative orientation of the array antennas at the base station. The coordinate system may be referred to as a reference coordinate system and may include a Cartesian coordinate system, a polar coordinate system or a geographic coordinate system. For example, at the antenna array an angle at which the beam arrives at the antenna array may be indicated. The angle together with the known orientation of the antenna array in the space defined by the reference coordinate system provides the DoA information.

The inventive approach for estimating the position is advantageous, as the mobile device does not need to perform any major calculations regarding received signals, rather, this processing is performed at the base station which may have larger processing capabilities and a continuous power supply. At the mobile device, on the basis of the information generated/calculated at the base station and transmitted to the mobile device, the estimation of the position can be performed at reduced calculation efforts, thereby allowing, for example when considering drones, small and lightweight processing units and still allowing for a reliable estimation of the position of the drone. Thus, an energy-efficient and low-complex position estimation at the mobile device is enabled.

In accordance with yet further embodiments of the first aspect of the present invention, on the basis of the information received at the mobile device in the second signal, the mobile device may estimate a direction to which a main lobe of a signal transmitted by the base station is directed, and the signal processing unit in the mobile device may give an indication of a direction into which the mobile device should be moved for improving the communication with the base station. This allows improving the communication, for example by improving the SNR or the wireless communication link.

In accordance with a second aspect of the present invention, an apparatus, like a base station, sends out, independent form any trigger signal from a mobile device, a beamformed signal including information about the direction of the signal or a main lobe of the signal. For example, in case the beam-direction of the base station is constant over some time the mobile device may evaluate the information about the main lobe of the signal from the base station, and the mobile device may be caused to move to a region having a higher or the highest SNR from the main lobe. In accordance with the second aspect, the direction information included in the signal from the base station is not the estimated DoA information of the signal from the mobile device, but the direction of the beam of the second signal, which may be a beam closest to the estimated DoA.

In accordance with the second aspect the present invention provides an apparatus, like a mobile device, including an antenna and a transceiver. The transceiver receives from a transmitter, like a base station, a signal via the antenna, which includes information about a direction of a main lobe of the signal transmitted by the transmitter. The apparatus includes a signal processing unit which estimates a direction of a main lobe of the signal received from the transmitter, and indicates, using a position of the apparatus and the estimated direction of the main lobe of the signal, a direction in which the apparatus should move to improve a communication with the transmitter.

In accordance with embodiments of the second aspect, the mobile device may receive a signal from a base station indicative of a main lobe direction of the beam sent out by the base station, and on the basis of this information the direction of the main lobe may be determined so as to indicate a direction into which the mobile device should be moved for improving the communication with the base station. No beacon signal may be send by the mobile device, rather, the base station may be configured to signal a beam direction within a beam transmitted. The signaling of the beam direction may be unique and different for each beam. The direction of the beam may be defined with respect to an anchor point, for example the centroid of an antenna array of the base station. Also, the orientation of the anchor point or the orientation of the antenna array may be provided, for example within a predefined, fixed coordinate system in which the base station and mobile device are located, and at the antenna array an angle at which the beam arrives at the antenna array may be indicated. The angle together with the known orientation of the antenna array in the space defined by the coordinate system provides the DoA information. As mentioned above, the coordinate system may be referred to as a reference coordinate system and may include a Cartesian coordinate system, a polar coordinate system or a geographic coordinate system. In accordance with further embodiments, the transceiver may transmit a beacon signal via the antenna, and a signal from the base station includes information about a direction of a main lobe of the signal, which is closest to a direction of arrival of the beacon signal at the base station.

Figure 2:
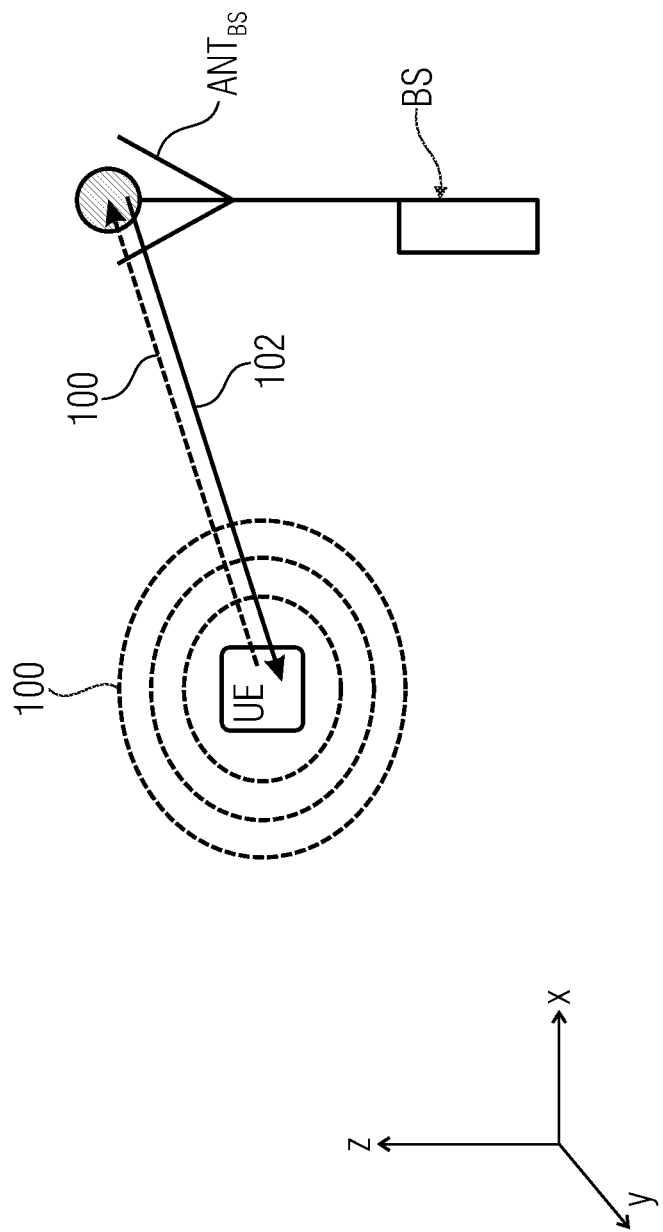
FIG. 2 is a schematic representation of an embodiment of the first inventive aspect in which a mobile device, responsive to a beacon signal sent to a bases station, receives from the base station information that may be used estimating its position and/or improving the performance of a communication with the base station.

FIG. 2 schematically represents an embodiment of the first inventive aspect in which a mobile device, responsive to a beacon signal sent to a bases station, receives from the base station information that may be used for estimating its position and/or improving the performance of a communication with the base station. A mobile device UE and a base station BS are schematically represented. The base station BS includes a plurality of antennas or an antenna array $ANT_{BS}$ also referred to as a multi-antenna transmitter/receiver point (TRP). The mobile device UE includes one or more antennas, not depicted in FIG. 2, and transmits a beacon signal 100 that is received at the base station BS. The beacon signal may include a unique signature or another unique identification associating the beacon signal 100 uniquely with the mobile device UE. In addition, the beacon signal 100 includes the request indicating to the base station BS that the mobile device UE needs beacon signal receive information at the base station BS, i.e. information about the specifics of how the beacon signal 100 is received by the receiver. At the base station BS, responsive to the request in the beacon signal, a direction of arrival (DoA) of the signal 100 is calculated or estimated. The base station BS generates a signal 102, also referred to as a response signal, that is transmitted to the mobile device UE. The signal 102 includes the estimated DoA of the beacon signal 100 as well as information representing a position of the base station BS, for example information about the anchor point.

In accordance with embodiments, the beacon signal 100 may be defined by a protocol or by a communication standard as used in the communication network. The beacon signal may be a random-based generated sequence which is unique for each mobile device UE in the system, or it may be a fixed sequence that is provided for the mobile device. The base station, in accordance with embodiments, may transmit via the TRP a beamformed signal including the estimated DoA information for the mobile device UE as well as information allowing the mobile device UE to determine the position of the base station BS. In accordance with embodiments, the beamformed signal 102 may be transmitted in a horizontal and vertical direction which are estimated, on the basis of the DoA information, to be the direction in which the mobile device UE is located. The signal 102 may include information that allow only the requesting mobile device UE to restore the message included in the signal 102, for example the information may be correlated with the unique identification of the mobile device UE such that only the intended mobile device UE may restore the message included in the signal 102.

The DoA information estimated or predicted by the bases station may include an horizontal angle and a vertical angle, or a direction vector including one or more components of a coordinate system in which the mobile device and the base station are located. The horizontal angle may range from 0° to 360° or from 0° to 180°, and the vertical angle may range from 0° to 180° or from 0° to 360°, or the horizontal and vertical angles may range from −180° to 180°, or the horizontal and vertical angles are indicated in radiant. In accordance with other embodiments, the DoA information may include a two- or three-dimensional vector having respective components of a coordinate system in which the mobile device and the base station are located, for example the x-, y-, z-components of a Cartesian coordinate system as indicated in FIG. 2.

The position of the base station BS may be indicated by providing a two- or three-dimensional vector indicating the respective components of the coordinate system in which the two entities are provided, or an identification may be transmitted, in case a lookup table or map is available to the mobile device UE for access. The lookup table or map includes positions associated with the respective base station identifications.

To improve the robustness of the signal transmission from the base station to the mobile device UE, in accordance with further embodiments, the base station may transmit the signal 102 several times. In case multiple antenna arrays are provided at the base station, multiple beams may be transmitted at the same time and frequency to provide a quasi-orthogonal transmission in the spatial domain, e.g., when a plurality of mobile devices, like drones, within the coverage area of the base station need to be provided with information allowing them to determine their positions. In accordance with other embodiments, spatial diversity using non-orthogonal beams may be provided to increase the receive SNR, e.g., when a robust information transmission to one mobile device is needed. The base station may transmit multiple beams on orthogonal resources, such as time, frequency or code domain. The one or more beams transmitting the signal 102 may be generated at the base station BS using a fixed codebook, or using the information about the position of the mobile device.

The inventive approach as described above with reference to FIG. 2 is advantageous as it does not require a dedicated data communication link from the mobile device UE to the base station BS, rather, in accordance with embodiments only a beacon signal including the additional information mentioned above is broadcast or transmitted by the mobile device. Responsive to the beacon signal at the base station BS, a one-way transmission back to the mobile device UE is sufficient for providing the information to the mobile device UE on the basis of which further estimations/improvements can be performed, as shall be described now with reference to further embodiments.

In accordance with an embodiment, the information from the signal 102 may be used by the mobile device UE to estimate its own position within the coordinate system in which the mobile device UE and the base station BS are arranged.

In accordance with one embodiment, the mobile device UE, using the signal 102 received from the base station BS, determines a distance between the mobile device UE and the base station BS. On the basis of the position of the base station BS and the direction into which the base station BS is located with respect to the mobile device UE, as signaled by the signal 102, and based on the calculated distance to the base station BS a position of the mobile device UE is determined at the mobile device UE. Thus, only a limited number of calculations and reduced calculation power is needed at the mobile device UE, which makes the inventive approach suitable for mobile devices, such a fast moving drones, which only have limited signal processing and battery capacities. The distance between the mobile device UE and the base station BS may be determined at the mobile device UE on the basis of the received power, for example the received signal strength indicator RSSI, the signal-to-noise ratio (SNR) or other metrics. In accordance with other embodiments, the distance may be determined on the basis of an estimation of the time of arrival (ToA) of the signal 102 which may include additional position reference signals (PRS) sent out by the base station BS. The PRS sequences are downlink signals that are designed for positioning purposes in a broadcast to the mobile devices in a cell served by a base station, and the ToA measurement, in the mobile device UE, is related to the geometric distance between the mobile device UE and the base station BS.

Figure 3:
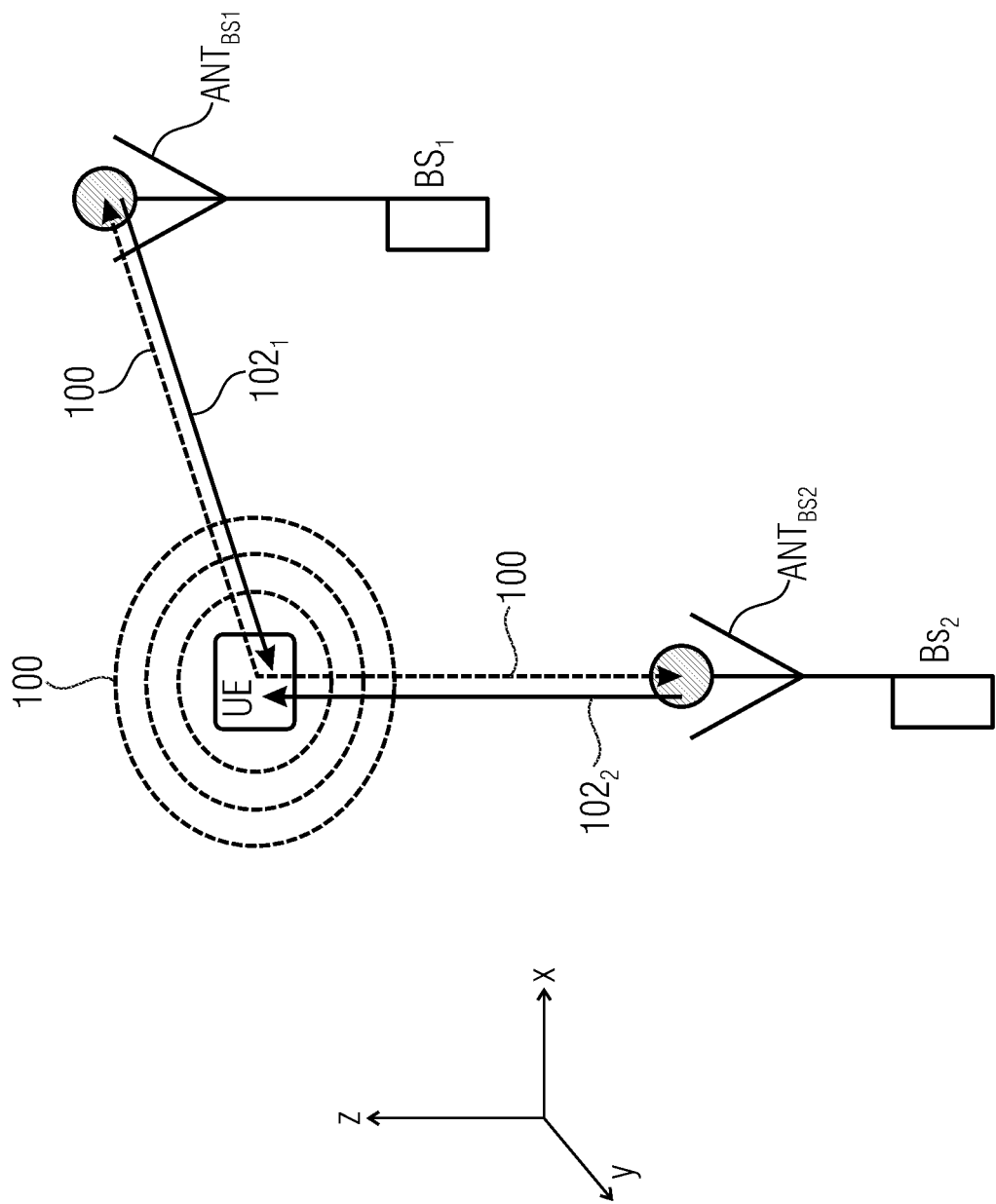
FIG. 3 is a schematic representation of an embodiment of the inventive approach for estimating a position of a mobile device.

FIG. 3 shows a schematic representation of another embodiment of the inventive approach for estimating a position of a mobile device UE. In accordance with the embodiment of FIG. 3, the mobile device UE receives a plurality of response signals from a plurality of base stations that received and processed the beacon signal 100 sent out from the mobile device UE. In FIG. 3, two base stations $BS_1$ and $BS_2$ are shown, although more than two base stations may be used. Base station $BS_1$ corresponds to the base station explained above with reference to FIG. 2, and base station $BS_2$ also receives the beacon signal 100 and provides in the response signal $102_2$, which sent back to the mobile device UE, the information about the DoA of the beacon signal 100 at the base station $BS_2$ as well as information allowing the determination of the position of the base station $BS_2$. In the embodiment of FIG. 3, the mobile device UE determines its location within the coordinate system in which all entities are located, on the basis of the DoA information included in the response signals $102_1$ and $102_2$ from the two base stations $BS_1$ and $BS_2$ as well as on the basis of the information about the positions of the base stations $BS_1$, $BS_2$ included in the signals $102_1$ and $102_2$.

Figure 4:
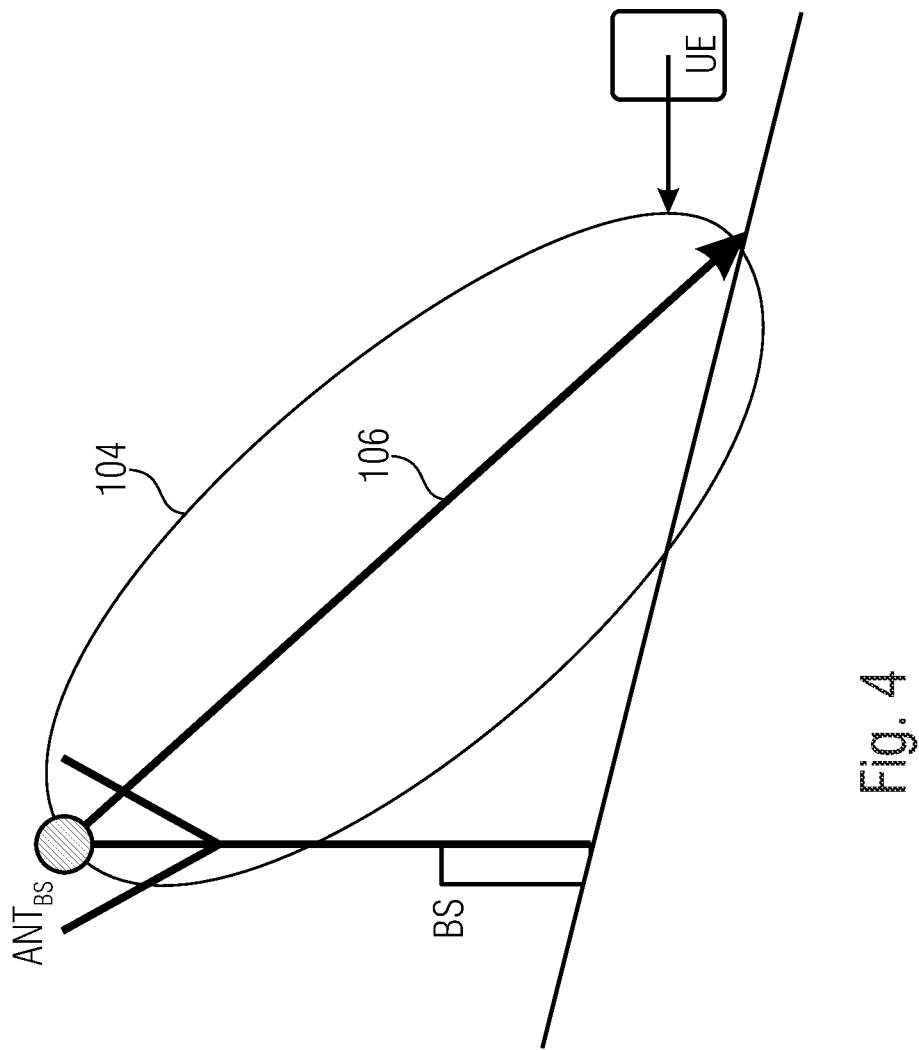
FIG. 4 depicts a further embodiment of the inventive approach in accordance with which the information provided from the base station towards the mobile device UE is used for improving the communication between the mobile device UE and the base station.

FIG. 4 depicts a further embodiment of the inventive approach in accordance with which the information provided from the base station towards the mobile device UE is used for improving the communication between the mobile device UE and the base station. The signal 102 provided by the base station in response to the beacon signal may include further information about a transmit signal 104 and a direction of a main lobe 106 thereof. The mobile device mobile device UE may obtain the beam direction as part of the signal 102 and the information position about the base station so as to determine where the main lobe 106 is directed to. In accordance with further embodiments, on the basis of the position of the mobile device UE and the information about the direction of the main lobe the mobile device UE may determine a direction into which it should move to be closer to the main lobe for improving the communication, for example the link SNR. The position of the mobile device UE may be determined by conventional approaches or in accordance with the above described embodiments. The embodiment described with reference to FIG. 4 may also be seen as providing a compass enabling the mobile device to improve the link quality by moving towards the main lobe, i.e., an improvement of the communication may be achieved without changing a configuration in the network or at the base station. For example, in case a user needs a large download, the compass function may be used to signal the user a direction to move thereby improving the SNR and, therefore, the downlink throughput.

In accordance with further embodiments, rather than providing information about the main lobe in response to the beacon signal transmitted by the mobile device UE, the base station may be implemented in such a way that the base station, when transmitting a signal being beamformed includes for each beam a direction information about the beam so that a mobile device UE, on the basis of the received information about the direction of the main lobe may indicate a direction into which the mobile device UE should be moved for improving the communication.

In accordance with the embodiments, rather than providing the DoA information in the signal 102, information about the main lobe may be provided, for example a main lobe direction may be indicated in the return signal 102 which is closest to the estimated DoA.

The inventive approach, as described above, provides for significant improvements over conventional approaches in that a low complexity position estimation at the mobile device is enabled using only the received DoA and position information at the mobile device. This allows for low energy consumption at the mobile device, and in the embodiments, in which the response signal 102 is correlated with the unique ID of the mobile device, the position information is secure and private to the mobile device and, the finally estimated position is not known at the base station but only at the mobile device. In addition, the mobile device does not need to be equipped with additional receivers, like GNSS receivers or WiFi receivers.

Figure 5:
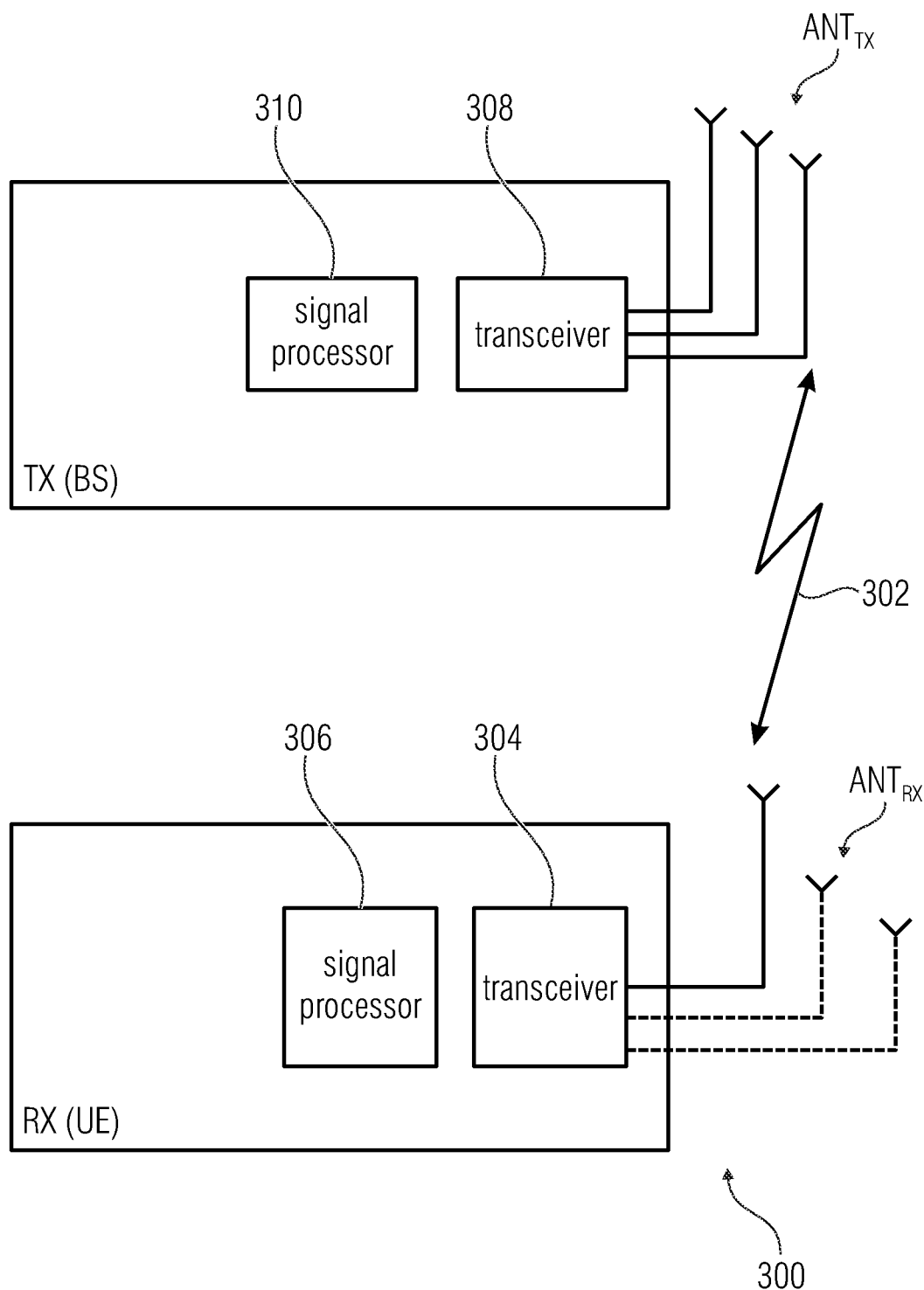
FIG. 5 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 5 is a schematic representation of a wireless communication system 300 for communicating information between a transmitter TX and a receiver RX. The transmitter TX includes a plurality of antennas $ANT_{TX}$ or an antenna array having a plurality of antenna elements. The receiver RX includes at least one antenna $ANT_{RX}$. In other embodiments, the receiver RX may include more than one antenna. As is indicated by the arrow 302 signals are communicated between the transmitter TX and the receiver RX via a wireless communication link, like a radio link. The transmission may be in accordance with the one of the techniques described above with reference to FIG. 1

The signaling between the transmitter TX and the receiver RX is in accordance with the above described embodiments of the present invention. For example, the receiver RX includes a transceiver 304 which transmits a first signal via the antenna $ANT_{RX}$. The first signal includes a unique identification of the receiver RX and a request for receive information about the first signal at the transmitter TX. The transceiver 304 receives from the transmitter TX a second signal via the antenna $ANT_{RX}$. The second signal includes first information about a direction of arrival (DoA) of the first signal transmitter TX and second information indicative of a location of the transmitter TX.

In accordance with embodiments, as described above, the receiver RX further includes a signal processing unit 306. The receiver RX may receive, using the from at least one further transmitter TX a further second signal via the antenna $ANT_{RX}$. The further second signal includes first information about a direction of arrival (DoA) of the first signal at the further transmitter TX and second information indicative of a location of the further transmitter TX. The signal processing unit 306 estimates a position of the receiver TX using the first and second information in the second signal received from the transmitter TX and in the further second signal received from the at least one further transmitter TX. In accordance with yet other embodiments, the signal processing unit 306 estimates a direction of a main lobe of the second signal using the first and second information in the second signal received from the transmitter TX. The signal processing unit 306 may then indicate, using a position of the receiver RX that may be determined as described above or by other means, and the estimated direction of the main lobe of the second signal, a direction in which the receiver RX should move to improve a communication with the transmitter TX.

In accordance with other embodiments, no first or beacon signal is transmitted by the receiver. The transceiver 304 of the receiver RX receives from the transmitter TX a signal via the antenna $ANT_{RX}$, which includes information about a direction of a main lobe of the signal transmitted by the transmitter TX. The signal processing unit 306 estimates a direction of a main lobe of the signal received from the transmitter TX, and indicates, using a position of the receiver RX and the estimated direction of the main lobe of the signal, a direction in which the receiver RX should move to improve a communication with the transmitter TX.

In accordance with embodiments, the transmitter TX may comprise a transceiver 308 to receive a first signal via the plurality of antennas $ANT_{TX}$. The first signal includes a unique identification of the receiver RX which transmits the first signal and a request for receive information about the first signal at the transmitter TX. In accordance with embodiments, the transmitter TX includes a signal processing unit 310 which estimates a direction of arrival (DoA) of the first signal. The transceiver 308 transmits to the receiver RX a second signal via the plurality of antennas $ANT_{TX}$. The second signal includes first information about the estimated direction of arrival (DoA) of the first signal at the transmitter TX and second information indicative of a location of the transmitter TX.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 6:
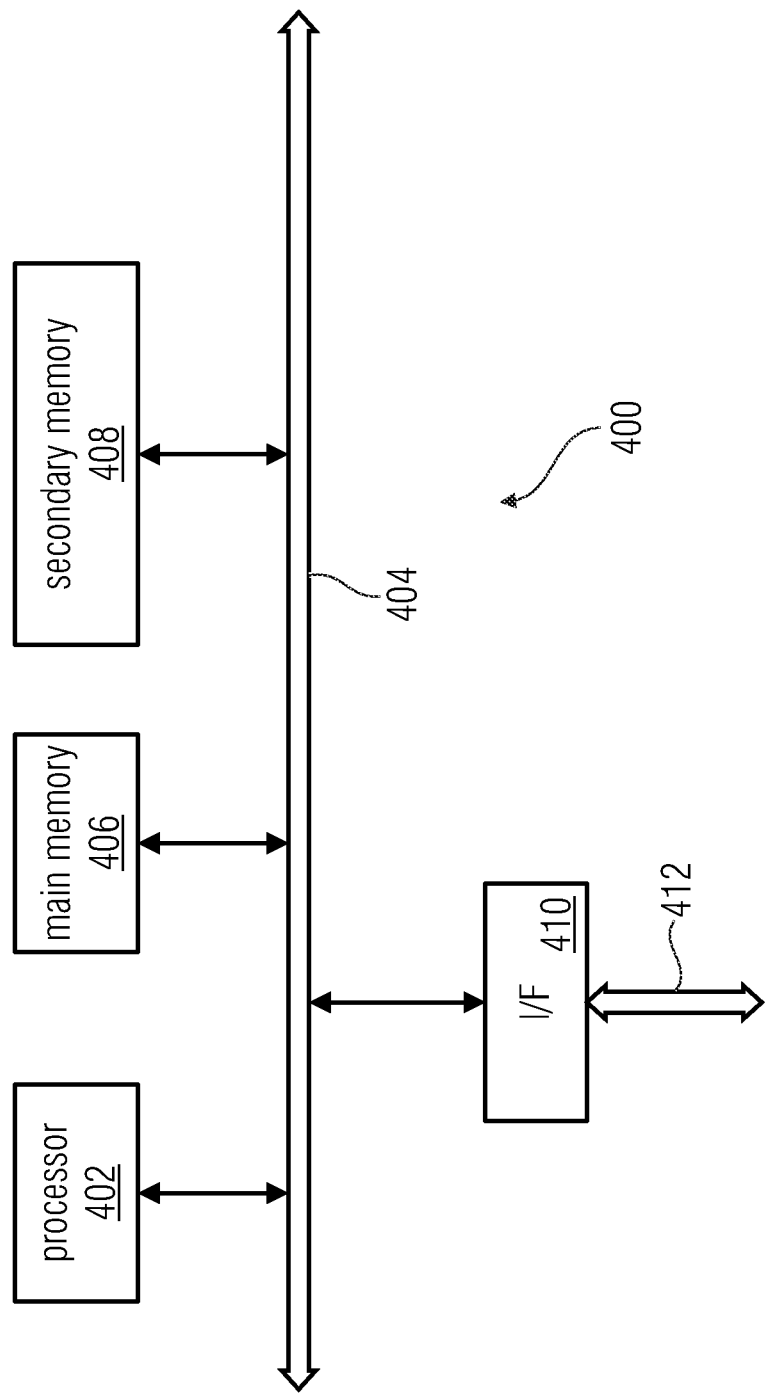
FIG. 6 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 6 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the form electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enable the computer system 400 to implement the present invention. In particular, the computer program, when executed, enable processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP, "LTE Positioning Protocol (LPP) (Release 13)", 3rd Generation Partnership Project, March 2016
[2] 3GPP, "LTE Positioning Protocol A (LPPa) (Release 13)", 3rd Generation Partnership Project, March 2016
[3] S. Fischer, "Observed Time Difference Of Arrival (OT-DOA) positioning in 3GPP LTE", Qualcomm White Pap, vol. 1, pp. 1-62, June 2014
[4] Misra and P. Enge, "Global Positioning System: Signals, Measurements and Performance Second Edition", Lincoln, Mass.: Ganga-Jamuna Press, 2006
[5] Y. H. Nam, M. S. Rahman, Y. Li, G. Xu, E. Onggosanusi, J. Zhang and J. Y. Seal, "Full dimension MIMO for LTE-Advanced and 5G", Information Theory and Applications Workshop (ITA), 2015, pp. 143-148, February 2015

[6] 3GPP, "Study on Elevation Beamforming/Full-Dimension (FD) MIMO for LTE", 3rd Generation Partnership Project, vol. V13.0.0, July 2015
[7] Y. Kirn, H. Ji, J. Lee, Y.-H. Nam, B. L. Ng, I. Tzanidis, Y. Li and J. Zhang, "Full dimension mimo (FD-MIMO): the next evolution of MIMO in LTE systems", Wireless Communications, IEEE, vol. 21, pp. 26-33, April 2014
[8] US 2016/0295366 A1
[9] US 2004/0072579 A1
[10] US 2013/0028246 A1
[11] US 2014/0162704 A1

The invention claimed is:

1. A mobile device for a wireless communication network, wherein the wireless communication network includes one or more base stations, the mobile device comprising:
an antenna; and
a transceiver, and
a signal processor,
wherein the transceiver is configured to
transmit a first signal via the antenna, the first signal comprising a unique identification of the mobile device and requesting a network entity of the wireless communication network to transmit to the mobile device a direction into which at least one base station is located with respect to the mobile device together with location information about a location of the base station, and
following the transmitting of the first signal, receive a second signal via the antenna, the second signal comprising the direction into which the at least one base station is located and the location information about the location of the base station, and
wherein the signal processor is configured to estimate a position of the mobile device using the direction and the location information included in the second signal.

2. The mobile device according to claim 1, wherein the direction comprises an horizontal angle and a vertical angle, or a direction vector comprising one or more components of a coordinate system in which the mobile device and the base station are located.

3. The mobile device according to claim 1, wherein
the horizontal angle ranges from 0° to 360° or from 0° to 180°, and the vertical angle ranges from 0° to 180° or from 0° to 360°, or
the horizontal and vertical angles range from −180° to 180°, or
the horizontal and vertical angles are indicated in radiant.

4. The mobile device according to claim 1, wherein the location information comprises data corresponding to a position or to an identification of the base station.

5. The mobile device according to claim 1, wherein the first signal is defined in accordance with a communication protocol/standard, and comprises a random-based generated sequence, which is unique for the mobile device, or a fixed sequence, which is unique for the mobile device.

6. The mobile device according to claim 1, wherein the respective second signals are beamformed signals.

7. The mobile device according to claim 1, wherein the second signal is correlated with the unique identification of the mobile device such that only an intended mobile device is able to restore the direction and the location information.

8. A network entity for a wireless communication network, wherein the wireless communication network includes one or more mobile devices and one or more base stations, wherein
the network entity is configured to
receive from a mobile device of the wireless communication network a first signal comprising a unique identification of the mobile device and requesting the network entity to transmit to the mobile device a direction into which at least one base station is located with respect to the mobile device together with location information about a location of the base station, and
following the receiving of the first signal, transmit to the mobile device a second signal, the second signal comprising the direction into which the at least one base station is located and the location information about the location of the base station so as to allow the mobile device to estimate its position using the direction and the location information included in the second signal.

9. The network entity according to claim 8, wherein the direction comprises an horizontal angle and a vertical angle, or a direction vector comprising one or more of a coordinate system in which the mobile device and the base station are located.

10. The network entity according to claim 8, wherein
the horizontal angle ranges from 0° to 360° or from 0° to 180°, and the vertical angle ranges from 0° to 180° or from 0° to 360°, or
the horizontal and vertical angles range from −180° to 180° or from −90° to 90°, or
the horizontal and vertical angles are indicated in radiant.

11. The network entity according to claim 8, wherein the location information comprises data corresponding to a position or to an identification of the base station.

12. The network entity according to claim 8, wherein the first signal is defined in accordance with a communication protocol/standard, and comprises a random-based generated sequence, which is unique for the mobile device, or a fixed sequence, which is unique for the mobile device.

13. The network entity according to claim 8, wherein the second signal is a beamformed signal.

14. The network entity according to claim 8, wherein the second signal is correlated with the unique identification of the mobile device such that only an intended mobile device is able to restore the direction and the location information.

15. A wireless communication network, comprising:
one or more mobile devices, one or more base stations, and a network entity,
wherein the network entity is configured to
receive from a mobile device of the wireless communication network a first signal comprising a unique identification of the mobile device and requesting the network entity to transmit to the mobile device a direction into which at least one base station is located with respect to the mobile device together with location information about a location of the base station, and
following the receiving of the first signal, transmit to the mobile device a second signal, the second signal comprising the direction into which the at least one base station is located and the location information about the location of the base station, and
wherein the mobile device is configured to estimate its position using the direction and the location information included in the second signal.

16. A method, comprising:
transmitting a first signal via an antenna of a mobile device of a wireless communication system, the first signal comprising a unique identification of the mobile device and requesting a network entity of the wireless communication network to transmit to the mobile device a direction into which the at least one base station of the wireless communication system is located together with location information about a location of the base station, following the transmitting of the first signal, receiving, from the network entity a second signal via the antenna of the mobile device, the second signal comprising the direction into which the at least one base station of the wireless communication system is located and the location information about the location of the base station, and estimating, by the mobile device, a position of the mobile device using the direction and the location information included in the second signal.

* * * * *